Patented Aug. 12, 1941

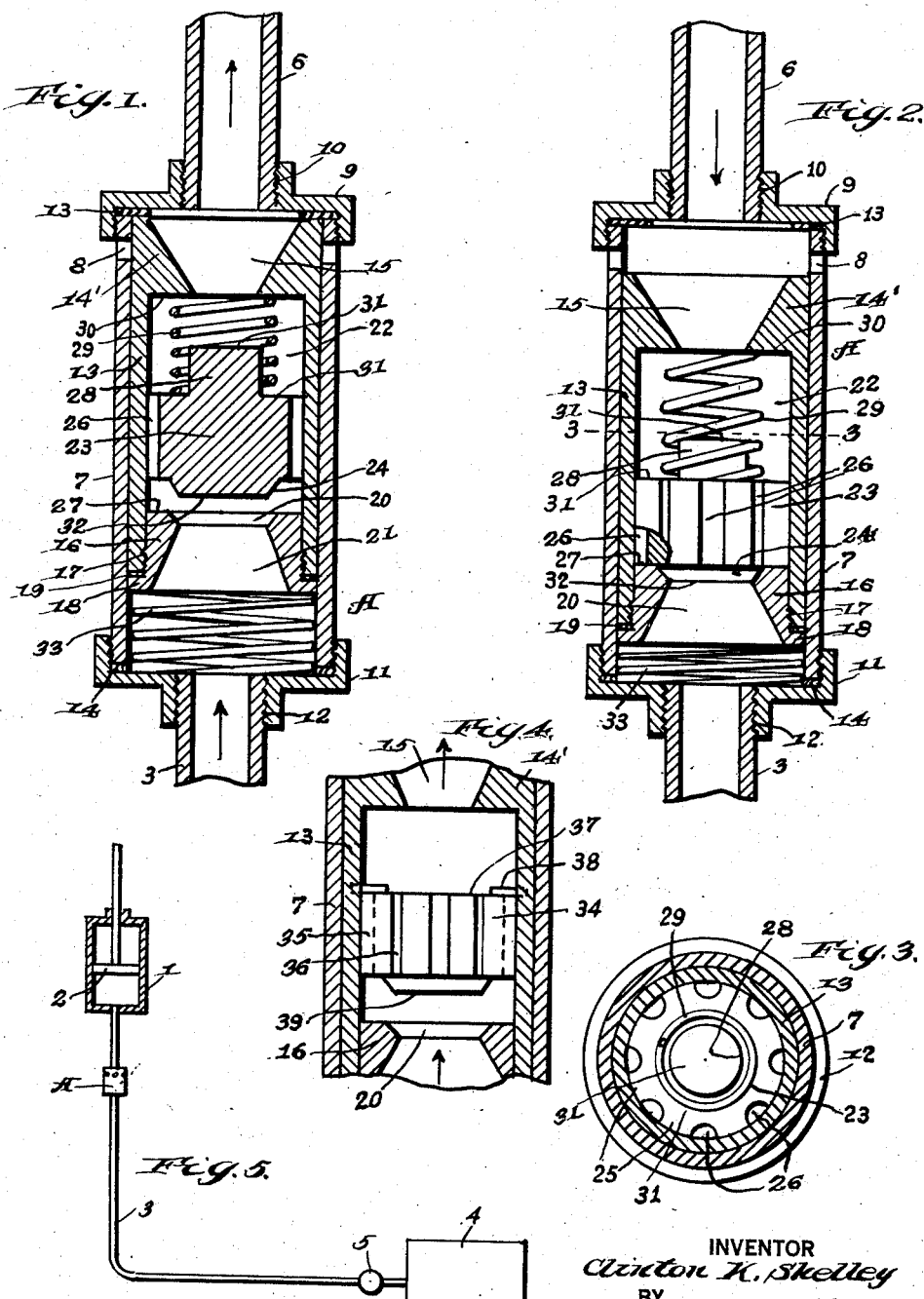

2,252,418

UNITED STATES PATENT OFFICE 2,252,418

RELEASE VALVE MECHANISM

Clinton K. Shelley, Bonners Ferry, Idaho

Application May 2, 1939, Serial No. 271,249

4 Claims. (Cl. 277—45)

This invention relates to improvements in quick release valve mechanisms for fluid pressure such as air.

The device of this invention is adapted for use in connection with pile drivers, power shovels, drag lines, or any like uses wherein it is highly desirable to afford a quick release of air pressure, after it has been applied, so as to speed up for a renewed air application, thereby reducing delay and serving to maintain maximum capacity of the operating mechanism.

In many instances, the source of supply of compressed air is located at a remote point with respect to the operating mechanism, or in other words, the mechanism to be operated, and when air is shut off, the recoil pressure is forced to exhaust throughout a considerable length of piping, thereby causing an appreciable delay of operation, as the alternate application and shut-off of air often occurs at a rate of thirty times a minute, in many forms of apparatus.

This rapid alternate air inlet and exhaust device is especially adapted to function in the class of apparatus above defined, and it differs essentially from the periodic application and exhaust of air in an air brake system for railroad cars or automobile busses and freight trucks because of the fact that in the latter uses, the rapidity with which the air is applied and exhausted is not a primary requisite, by reason of the periodic and often prolonged time at which such changes occur, whereas, the present invention is especially designed to function in a capacity in which an extreme rapidity of alternate application and exhaust of air is absolutely essential to normal operation. In other words, in which rapidity of such alternate action is constantly the rule rather than the exception.

The invention has many other objects and features which will be more fully described in connection with the accompanying drawing and which will be more particularly pointed out in and by the appended claims.

In the drawing—

Fig. 1 is a sectional view of one form of my device with the parts in an operating or non-exhaust position.

Fig. 2 is a similar view with the parts in a non-operating or exhaust position.

Fig. 3 is a sectional view on line 3—3 of Fig. 2.

Fig. 4 is a fragmentary sectional view of a modified form of the invention.

Fig. 5 is a diagrammatic view showing one use of the device as it would be connected up in practice.

Like characters of reference designate similar parts throughout the different figures of the drawing.

In Fig. 5, I have diagrammatically shown one of the many uses of the invention wherein a working cylinder 1, having a piston 2, for actuation of any type of machinery, is shown connected with a fluid pressure pipe for conveying compressed air, the pipe being indicated at 3, and being connected with a pressure tank 4, which may be supplied with compressed air from any source, not shown. A valve 5, mechanically actuated, to be alternately opened and closed, is shown relatively close to the tank 4, and the device of my invention is indicated at A, as being interposed in pipe 3, near the cylinder 1. In practice, the tank 4, may be even fifty feet or more from cylinder 1, and the advantage of disposing my improved quick release valve mechanism closely adjacent the operating cylinder 1, will be presently explained.

With reference to Figs. 1 and 2, I shall refer to the pipe 3, as an inlet connection, and to a pipe 6, as an outlet or recoil connection. I have shown a housing 7, which may be cylindrical in form, and the same is provided with one or more exhaust ports or openings 8, preferably near the outlet connection 6. A head 9, is shown threaded on one end of housing 7, and having threaded engagement at 10, with outlet connection 6, while a similar head 11, closes the remaining end of housing 7, and has threaded connection with inlet 3, at 12. Suitable packing 13 and 14 is provided, as may be dictated by mechanical skill, and it will be understood that the capacity of the exhaust ports 8, will be proportioned to accommodate the desired rate of exhaust, with reference to the capacity of the inlet and outlet connections, in order that the rate of exhaust shall effectively meet requirements, all of which is a matter of designing.

Reference will next be made to my improved release piston and to the means whereby the same is actuated to be moved, or in this instance, reciprocated into different positions in the housing.

As shown, the piston is formed of a shell having a longitudinal section 13, which is cylindrical, to slidably fit the interior of housing 7, and this shell is sufficiently short in length, with respect to the length of the housing, to permit the shell to reciprocate therein. Said shell is provided with a head 14', which functions to control the exhaust ports 8, by either closing or opening the same, and said head has a bore 15, in constant communication with the outlet connection 6. I have shown the remaining end of said shell provided with a valve seat section 16, which may have threaded connection with said shell, as indicated at 17, a flange 18, affording a means for engaging an interposed packing 19. Said seat section is provided with a valve seat 20, and has a bore 21, that is in constant communication with the inlet connection 3. As the interior 22, of shell 13, is hollow, it will now be clear that with the bores 15 and 21. I have provided the piston with a continuous passage bore affording a flow therethrough of fluid pressure from the inlet connection 3, to the outlet connection 6, and for reverse passage of recoil pressure from outlet 6, into said bore, as shown by arrows in Figs. 1 and 2.

Reference will next be made to my improved piston actuator which is herein shown in the form of a valve closure adapted to coact with valve seat 20.

Said closure is indicated at 23, and is provided with a closure portion 24, adapted to engage said seat 20. Said closure 23, is provided with guiding means whereby it will be maintained in alinement with said seat 20, when moving toward or away from said seat, and as shown, I have provided said closure with guiding portions that are peripherally arranged to engage shell 13, as indicated at 25. Between these guiding portions, 25, the closure is peripherally recessed at 26, to provide a plurality of by-pass ports for passage of the pressure fluid past said closure when the same is un-seated.

The valve seat section 16, is provided with a port closing face 27, surrounding seat 20, for closing said by-pass ports 26, when closure 23, is seated, as shown in Fig. 2. Said closure 23, is provided with a spring retaining boss 28, for holding an expansively acting spring 29, in interposed relation between said closure 23, and a portion of the bore passage, which, as shown, is a shoulder 30. The end of boss 28, and the upper face of the closure 23, constitute a recoil pressure face 31, and the remaining side will be designated as the inlet pressure face 32. While spring 29, normally acts to seat closure 23, it will be of insufficient strength so to do, as the closure must be seated or moved toward and into engagement with seat 20, against the incoming flow of pressure fluid, and the incapacity of spring 29, to seat the closure, under certain conditions, is a feature to be later described. The spring 29, functions as a means to limit unseating movement of the closure and to shift the piston into an exhaust closing position.

Because of the rapidity with which the piston is shifted from exhaust closing to opening positions, and vice versa, I may provide a cushioning spring 33, between head 11, and one end of the piston to cushion the movement of said piston, however, in actual practice, I have successfully operated the device without this spring.

In order to render the opposed faces 31 and 32, more effective, I have shown the bore 15 diverging endwise of the piston and likewise, bore 21, to thus reduce the end areas of the piston, and hence, to a major extent, both the recoil and the incoming pressure will be localized against the opposite pressure faces of the closure.

Reference will next be made to the modified form shown in Fig. 4.

In this form, all the parts are the same as in the preferred form, and have the same reference numerals except the closure 34. I have shown this closure provided with the same guiding portions and by-pass ports, 35 and 36, respectively, as in the preferred form but have omitted boss 28, and the spring 29. I have shown one pressure face 37, flat, and have provided stops 38, fixed to shell 13, for limting endwise movement of closure 34, toward the outlet end of the device when said closure is shifted into a passage opening position, as shown in Fig. 4. The remaining or incoming pressure face 39, being the same as in the preferred form. As will later appear, both the spring 29, and the stops 38, broadly function as a piston shifting means, only the spring has the advantage of shifting the piston yieldingly.

While the operation may be clear from the foregoing, I will briefly recapitulate the same as follows:

Assuming that the device is in the exhaust opening position shown in Fig. 2, with the closure 23 seated to close the bore passage, and the valve 5 closed, it will be clear that the exhaust ports 8 are fully open. Now suppose the valve 5, is opened, then the incoming pressure through connection 3, will first enter the bore passage and will engage the pressure face 32, of closure 23. Since this pressure fluid acts with full force almost instantly, and since spring 29, is not strong enough to maintain the closure 23 seated against the incoming pressure, the resulting thrust will almost instantly act through spring 29, to not only un-seat said closure but also to shift the piston from the exhaust opening position shown in Fig. 2, to the exhaust closing position shown in Fig. 1.

It is immaterial to the efficiency of the device, whether the incoming pressure shifts the piston before or after it un-seats the closure 23, since the main office of spring 29, is to act upon the piston, specifically, shoulder 30, thereof, to shift the piston into the Fig. 1 position, whereupon the spring will be placed under tension and will limit movement of the closure 23, endwise, beyond the approximate position shown in Fig. 1, as further opening movement of said closure is unnecessary. In any event, the spring 29, will function to yieldingly shift the piston and cushion the shock of impact of the latter against head 9, of the housing. This is important, since the rapid movement of the piston causes shattering and considerable wear on the housing.

The incoming pressure will thus constantly engage face 32, of closure 23, and will be diverted thereby into the by-pass ports 26, flowing past closure 23, and endwise of the bore passage into outlet connection 6, and then to the parts to be actuated. As long as incoming pressure continues, the parts will be in the position shown in Fig. 1, and of course there will be a considerable pressure beyond the device, which may be termed the actuating pressure that might be disposed in cylinder 1, for instance.

Now when valve 5, is shut off, it is highly desirable to quickly relieve the actuated parts from this accumulated pressure, as otherwise, operations will be very greatly retarded. Thus when valve 5, is closed, this reduces the pressure on one side of the piston, namely, the valve seat end, and consequently, the actuating or accumulated pressure will instantly recoil from said outlet connection 6, back into the bore passage of the piston and into engagement with the recoil pressure face 31, of closure 23, as shown by the arrow in Fig. 2. Of course, spring 29, will have seated closure 23, just as soon as pressure in the valve seat end of the piston has been reduced.

Thus, recoil pressure will almost instantly act against pressure face 31, and shift the piston into the exhaust opening position shown in Fig. 2, as such pressure will instantly seat the closure and hence it can act on a rigid structure. This will quickly exhaust the recoil pressure through ports 8, and of course no dust can enter housing 7, while exhaust is taking place, and when exhaust is not taking place, there is no circulation that would permit entrance of dust. In fact, the alternate movement of the piston is so rapid that no dust problem is involved.

If it is not desired to employ spring 29, the closure 34, of Fig. 4, will function in all other respects in precisely the same manner except that the yielding action of the spring will be missing. However, closure 34, will be as effective in shifting the piston into an exhaust closing position, and the recoil action will almost instantly seat the closure and shift the piston into an exhaust opening position. The spring 33, will cushion the impact of the piston in the latter movement.

Lubrication of the parts is effected by the drip oil supply usually applied at the compressor.

Now it will be clear that I have avoided all auxiliary means heretofore necessary to shift the release valve, and have devised a release valve mechanism that is self-contained and wholly enclosed, and which operates automatically, responsive to air pressure flowing therein.

While I have herein shown and described specific forms of my invention, I do not wish to be limited thereto except for such limitations as the claims may import.

I claim:

1. A quick release valve mechanism, comprising a cylindrical housing having an inlet and an outlet connection for pressure fluid and provided with exhaust ports near said outlet connection, a release piston slidable in said housing for controlling said exhaust ports and having a passage bore for passage therethrough of fluid pressure from said inlet to said outlet connection, a piston actuating valve closure in said passage bore having oppositely disposed pressure engageable faces for causing shifting movement of said piston into exhaust closing or opening positions, said closure being in peripheral engagement with said bore for sliding movement lengthwise thereof independently of said piston and having peripheral by-pass ports for normal passage of pressure fluid past said closure when the latter is un-seated, said bore having a valve seat for coaction with said closure to close said bore and said by-pass ports when said closure is seated, and an expansively acting spring interposed between said closure and a portion of said bore and acting with recoil pressure on one face of said closure to seat the latter when pressure on the inlet side of said piston is reduced to shift said piston into an exhaust opening position, and said spring serving to yieldingly shift said piston into an exhaust closing position when incoming pressure on the remaining face of said closure un-seats the latter.

2. A quick release valve mechanism, comprising a housing having an inlet and an outlet connection for pressure fluid and provided with an exhaust port, a release piston slidable in said housing for controlling said port and having a passage bore for passage therethrough of pressure fluid from said inlet to said outlet connection, a piston actuating valve closure slidably guided in said bore in clearance relation therefrom and having oppositely disposed pressure engageable faces for causing shifting movement of said piston into exhaust closing or opening positions, said bore having a valve seat for coaction with said closure to close said bore when said closure is seated, and an expansively acting spring interposed between said closure and a portion of said bore for seating said closure while recoil pressure on one face acts to shift said piston into an exhaust opening position when incoming pressure is reduced, and said spring engaging and yieldingly shifting said piston into an exhaust closing position when incoming pressure on the remaining face of said closure un-seats the latter and opens said bore.

3. A quick release valve mechanism comprising a housing having an inlet and an outlet connection for pressure fluid and provided with an exhaust port, a release piston slidable in said housing for controlling said port and having a passage bore for passage therethrough of pressure fluid from said inlet to said outlet connection and said bore having a valve seat, a piston actuating valve closure slidably guided in said bore in clearance relation thereto for escape of pressure fluid past said closure when the latter is un-seated, said closure having oppositely disposed pressure engageable faces for causing shifting movement of said piston into exhaust closing or opening positions and being limited in movement in one direction by said seat, and means for restricting movement of said closure in another direction, whereby incoming pressure will act on one face of said closure to un-seat the latter against said means and open said bore and shift said piston into an exhaust closing position, and whereby recoil pressure against the remaining face of said closure will seat the latter and close said bore and shift said piston into an exhaust opening position when incoming pressure is reduced.

4. A quick release valve mechanism comprising, a housing having an inlet and an outlet connection for pressure fluid and provided with an exhaust port, a release piston slidable in said housing for controlling said port and having a passage bore for passage therethrough of pressure fluid from said inlet to said outlet connection and recoil back pressure from said outlet connection, said bore having a valve seat, a piston actuating valve closure for opening or closing said bore and having an incoming pressure engageable face and a recoil pressure engageable face and being movable against incoming pressure toward said seat, and a spring incapable of seating said closure against incoming pressure and sustaining said closure in a bore open position and engaging said piston to hold the latter in an exhaust closing position until incoming pressure is reduced, whereupon said spring will seat said closure and recoil pressure will engage said recoil pressure face and cause said closure to shift said piston into an exhaust opening position.

CLINTON K. SHELLEY.